United States Patent [19]
Edwards

[11] Patent Number: 5,397,964
[45] Date of Patent: Mar. 14, 1995

[54] REFLECTED ENERGY ADAPTIVE INDUCTIVE LOAD DRIVER AND METHOD THEREFOR

[75] Inventor: William E. Edwards, Barrington, Ill.

[73] Assignee: Motorola, Inc., Schaumburg, Ill.

[21] Appl. No.: 891,891

[22] Filed: Jun. 1, 1992

[51] Int. Cl.[6] .......................................... H05B 37/02
[52] U.S. Cl. ........................ 315/209 T; 315/209 M; 315/276; 315/283; 315/224; 123/198 DB
[58] Field of Search ............... 315/209 T, 283, 276, 315/307, 224, 209 M; 123/148 E, 198 DB

[56] References Cited
U.S. PATENT DOCUMENTS

4,117,819 10/1978 Jarrett et al. ................... 315/209 T
4,176,625 12/1979 Stauffer ............................... 123/32
5,065,073 11/1991 Frus ................................. 315/209 T

*Primary Examiner*—Robert J. Pascal
*Assistant Examiner*—Reginald A. Ratliff
*Attorney, Agent, or Firm*—Nicholas C. Hopman

[57] ABSTRACT

An inductive load driver is constructed with a driving means (205), responsive to a control input (211). The driving means (205) provides energy to an inductive load (203) and then prevents the providing of energy to the inductive load (203). The inductive load (203) reflects the previously provided energy to the driving means (205) when the driving means (205) is preventing the providing of energy. A control means adjusts the energy to the inductive load (203) responsive to the reflected energy provided by the inductive load (203).

29 Claims, 4 Drawing Sheets

REFLECTED ENERGY ADAPTIVE INDUCTIVE LOAD DRIVER AND METHOD THEREFOR

FIELD OF THE INVENTION

This invention is generally directed to the field of inductive load drivers and more specifically to inductive load drivers adaptive to various load conditions.

BACKGROUND OF THE INVENTION

Inductive load drivers, more particularly ignition coil drivers, are generally designed to drive an inductive load over a very broad range of operating conditions. These operating conditions include extremes of ambient temperature, source voltage, engine RPM and load demand.

In an internal combustion engine based ignition system, a coil driver is employed to repetitively transfer energy from an electrical system to a primary winding of an ignition coil. At the appropriate time, this energy is transferred from the primary winding through a secondary winding to a spark plug where the energy is dissipated, igniting fuel in a cylinder.

During this process the amount of energy the coil driver transfers can be about 100 millijoules. In typical designs the coil driver, due to losses inherent in the design, will dissipate about 10 millijoules of this energy. Correspondingly, the average power dissipation of the coil driver is relatively small. This power dissipation is engine RPM dependent and typically is about 1.5 watts at 3,500 RPM. This results in an average rise in coil driver temperature of about 6 degrees Celsius.

If an ignition coil open secondary condition occurs, the energy stored in the primary winding of the ignition coil must be absorbed by the coil driver. This is because an impedance in the secondary winding, that under normal operating conditions is typically very low, is now very high. This results in the energy being reflected from the secondary winding back to the primary winding and finally back to the driver. An open secondary condition can occur many ways including; a disconnected spark plug wire, a cracked spark plug, or an opening of the secondary winding to cite a few. Because an open secondary condition can persist, the coil driver must be designed to have a reserve power dissipation capability to absorb the resulting excess energy without self destruction. This additional demand requires that the coil driver must withstand the 100 millijoules of energy normally transferred from the primary winding to the secondary winding, raising the expectation from 10 millijoules to 110 millijoules of energy. Repetitive application of this condition will cause the temperature of the coil driver to increase dramatically. Consequently, this additional demand corresponds to an approximate power dissipation of 8 watts at 3,500 RPM and an average rise in coil driver temperature of 32 degrees Celsius.

Figure 1:
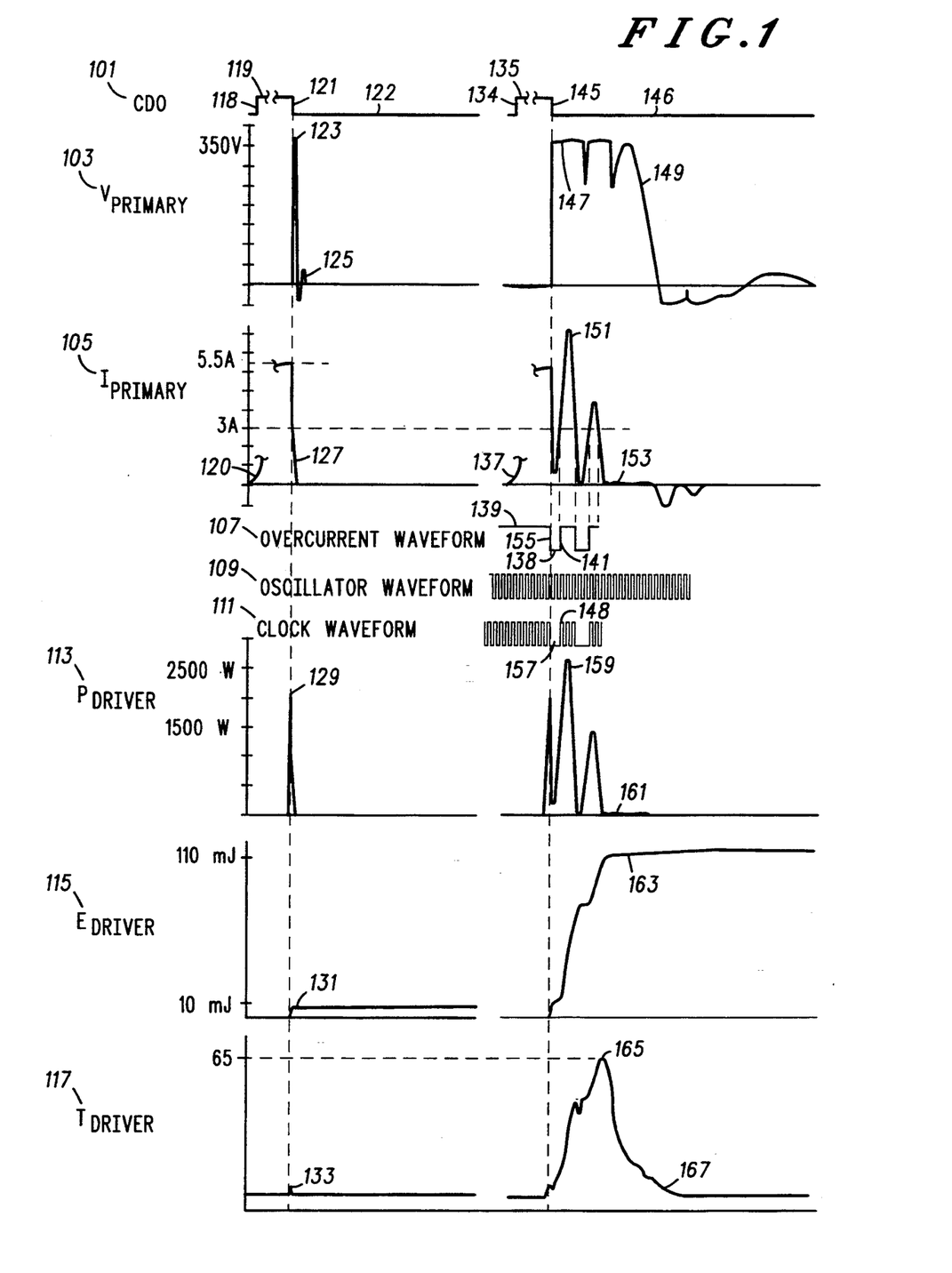
FIG. 1 is a series of waveforms for signals found in inductive load drivers as described in the Background of the Invention and also at various locations in an inductive load driver shown in FIG. 2.

FIG. 1 illustrates a set of typical waveforms found in a coil driver. The set on the left represents coil driver waveforms found during normal operation of an ignition cycle. The set on the right represents coil driver waveforms found during an open secondary condition.

Referring to the normal operation of an ignition cycle, as shown in the leftmost waveforms, a CDO, or coil driver on, waveform 101 transits at 118 to an on-state 119. This causes a coil driver to provide current to a primary winding of an ignition coil. This primary winding current, $I_{primary}$ 105, builds from zero amps to about 5.5 amps as shown by reference number 120. This action builds the about 110 millijoules of energy in the primary winding mentioned earlier. Note that the CDO and $I_{primary}$ waveforms 101 and 105 are shown with an interrupted time line. This is done to maintain a time scale favoring illustration of the instantaneous behavior of various waveforms after a falling transition 121 of the CDO waveform 101. The waveforms shown after the transition at 121 are significantly shorter in duration than the waveforms shown before the transition. When the primary winding of the coil is fully charged, the CDO waveform 101 transits at 121 to an off-state 122. This causes several things to happen. A voltage, $V_{primary}$ 103, builds across the primary winding of the coil and is clamped at a voltage peak 123 of about 350 volts. This clamping is designed to protect the coil driver. $V_{primary}$ 103 is transformed by a secondary winding of the coil to a very high voltage, on the order of 30,000 volts, and fires a spark plug. During this time the energy in the secondary winding is primarily dissipated across the spark plug. Also, $I_{primary}$ 105 falls rapidly to zero, as shown by reference number 127, and $V_{primary}$ 103 falls rapidly to zero, oscillating slightly, as shown by a portion 125 of the waveform 103. Because the coil driver cannot force this current $I_{primary}$ 105 instantaneously to zero a small amount, typically 10 millijoules of energy is dissipated in the coil driver as described earlier. An $E_{driver}$ graph 115 shows this energy at reference number 131.

At the same time, an instantaneous power of about 1,600 watts is dissipated in the coil driver. A $P_{driver}$ graph 113 shows this power at reference number 129. Note that this corresponds to an average power dissipation of 1.5 watts at 3,500 engine RPM as mentioned earlier. This increase in power dissipation causes a rise in the temperature of the coil driver. A $T_{driver}$ graph 117 shows this rise in temperature at reference number 133. The average rise in temperature of the coil driver will be about 6 degrees Celsius as mentioned earlier.

Conversely, if the coil driver is driving a coil primary winding that has an open secondary winding, the second set of waveforms, on the right hand side of FIG. 1 apply. First, the CDO waveform 101 transits at 134 to an on-state 135 and $I_{primary}$ 105, builds from zero amps to about 5.5 amps as shown by a portion of 105 indicated by reference number 137. This action builds the about 110 millijoules of energy mentioned earlier. When the primary winding of the coil is fully charged, the CDO waveform 101 transits at 145 to an off-state 146. $V_{primary}$ 103 builds across the primary winding of the coil and is again clamped at a voltage 147 of about 350 volts. Because in this case the secondary winding of the coil is open the spark plug will not dissipate the energy and the about 110 millijoules of energy now in the primary winding of the coil must be dissipated in the coil driver. Consequently, the primary winding voltage $V_{primary}$ 103 does not fall rapidly to zero as it did earlier. Also, $I_{primary}$ 105 pertubates, as shown by waveform portion 151, and finally falls to zero, as shown by reference number 153. This pertubation is responsive to the impedance in the secondary winding 203. Notice that both the $V_{primary}$ waveform 103 and the $I_{primary}$ waveform 105 between the transition 145 to the off-state 146 of the CDO waveform 101 and reference number 153, are of a significantly longer duration than the waveforms found during normal operation of an ignition cycle detailed earlier.

Consequently, an instantaneous, and pertubating power of about 2,500 watts is dissipated over an elongated interval. This is shown in the $P_{driver}$ graph 113 at reference number 159. The energy dissipated in the coil driver is shown in the $E_{driver}$ graph 115 at reference number 163. Eventually, when the energy is dissipated in the coil driver, the instantaneous power dissipation falls to zero as shown by reference number 161. Note that this corresponds to an average power dissipation of 8 watts at 3,500 engine RPM as mentioned earlier. This increase in power dissipation causes a rise in the temperature of the coil driver. This is shown in the $T_{driver}$ graph 117 at reference number 165. This rise in temperature can peak at about 65 degrees Celsius before falling to zero, as shown by reference number 167. The average rise in temperature of the coil driver will be about 32 degrees Celsius as mentioned earlier.

In an automotive environment the coil driver is expected to operate at the high temperatures the engine must operate under. When the coil driver must dissipate additional energy, due to an open secondary condition, this will cause excessive high temperature operation of the coil driver. The heat that the coil driver must dissipate significantly reduces the reliable life of the coil driver. Additionally, large and bulky heat sinks are required to protect the coil driver from thermal destruction, making manufacturing and installation more difficult.

What is needed is an inductive load, or coil, driver that is adaptive to known variations in load conditions such that the load coil driver provides the drive required while avoiding high power dissipation in the driver and maximizing reliability, compactness, and ease of manufacture.

SUMMARY OF THE INVENTION

An inductive load driver constructed of a driving means, responsive to a control input. The driving means provides energy to an inductive load, and then prevents the providing of energy to the inductive load. The inductive load reflects the previously provided energy to the driving means when the driving means is preventing the providing of energy. A control means provides a drive waveform to the control input of the driving means for adjusting the energy to the inductive load, responsive to the reflected energy provided by the inductive load.

DETAILED DESCRIPTION OF A PREFERRED EMBODIMENT

As detailed earlier, if an ignition coil open secondary condition occurs, the energy stored in a primary winding of an ignition coil must be absorbed by a coil driver. This is because an impedance in a secondary winding, that under normal operating conditions is typically very low, is now very high. This results in the energy being reflected from the secondary winding back to the primary winding and finally back to the driver.

In an embodiment presented below an improved inductive load, or coil, driver is provided. It is based on the concept that in a internal combustion engine application there is no need to continue to source a same amount of energy to an ignition coil when its secondary winding is open, compared to when the secondary winding is in a proper condition.

In general, the improved inductive load, or coil, driver discussed herein, will adaptively provide energy to a primary winding of an ignition coil. If an open secondary condition is recognized, the energy provided to the primary winding of the ignition coil will be reduced, to preferably a substantially and non zero level to compensate for the energy reflected to the driver. This will limit the power dissipation of the coil driver to a predetermined safe level sufficient to fire a spark plug, but insufficient to over dissipate the coil driver. This will enable the construction of a more reliable, smaller, and more manufacturable inductive load driver for application in an internal combustion engine based ignition system. In order to determine if an open secondary condition exists, the improved inductive load driver measures an energy reflected from the primary winding of the ignition coil. First, the individual elements will be introduced and detailed.

As described earlier, FIG. 1 illustrates a set of typical waveforms found in an inductive load driver. The set on the left represents inductive load driver waveforms found during normal operation of an ignition cycle. The set on the right represents inductive load driver waveforms found during an open secondary condition. The set of waveforms on the right will be used to illustrate the benefit of this embodiment of the invention. Not introduced earlier are an overcurrent waveform 107, an oscillator waveform 109, and a clock waveform 111. These waveforms are shown in FIG. 1 and are representative of the waveforms found in a circuit shown in FIG. 2 and described below.

Figure 2:
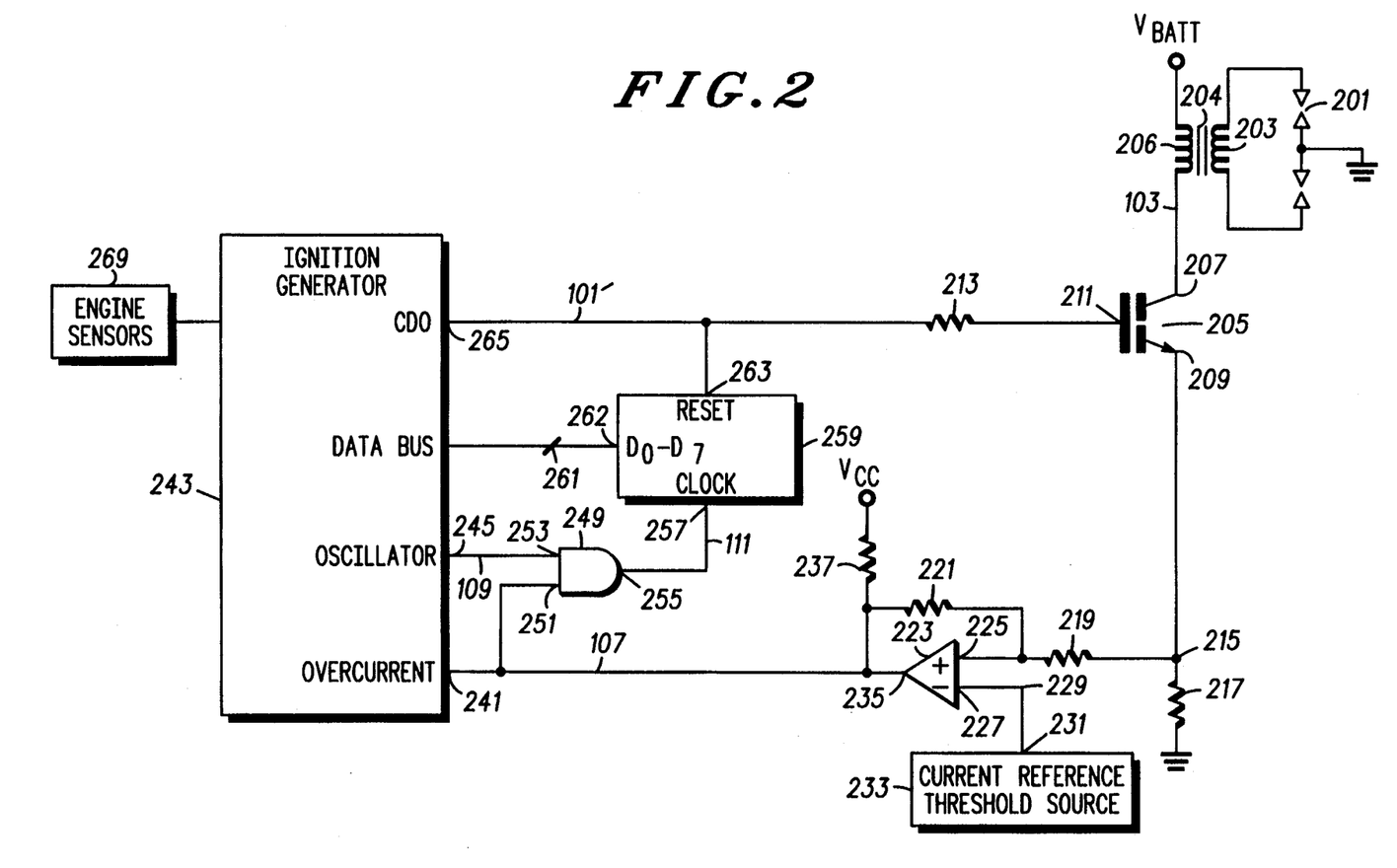
FIG. 2 is a schematic block diagram of an inductive load driver applied in a internal combustion engine ignition system, in accordance with the invention.
Figure 3:
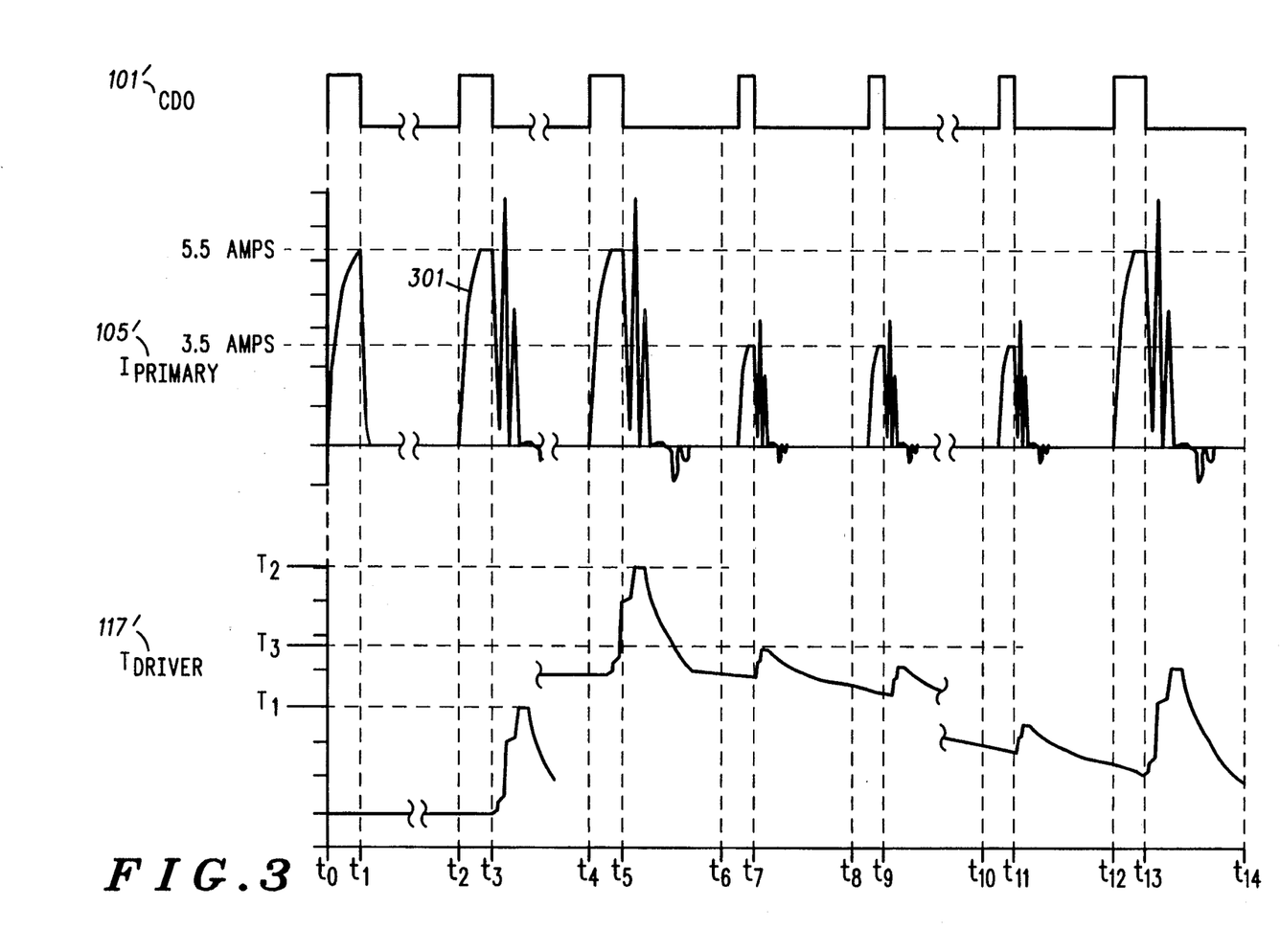
FIG. 3 is a series of waveforms for signals found at various locations in the inductive load driver shown in FIG. 2.

FIG. 2 shows an inductive load driver optimized for application in a internal combustion engine ignition system. The apparatus includes a spark plug 201 driven by a secondary winding 203 of an ignition coil 204. The ignition coil 204 has a primary winding 206 coupled to a drive output, or collector, 207 of a drive transistor 205. A Motorola MPPD2020 IGBT device is applied in the preferred embodiment for the drive transistor. This IGBT device has an internal 350 volt clamp circuit. Of course, it would be obvious to one of ordinary skill in the art to substitute another type of switching element for the selected transistor. The drive transistor 205 has a sense output, or an emitter, 209 that is coupled to a current sense resistor 217 for producing a voltage, at a location shown by reference number 215, that is indicative of the current present in the primary 206 of the ignition coil 204. Depending on a state of the drive transistor 205 this voltage 215, represents a current provided by the drive transistor 205 to the primary winding 206 of the ignition coil 204, or a current reflected by the primary winding 206 of the ignition coil 204 to the drive transistor 205. The voltage 215 is coupled to a resistor 219 that is connected to a positive input 225 of a comparator 223 having a hysteresis resistor 221. A negative input 227 of the comparator 223 is driven by a voltage 229, representing a current reference threshold, derived from the output 231 of a current reference threshold source 233. In this case, the current reference threshold source 233 is constructed of a simple voltage reference circuit and provides a voltage representing a current through the resistor 217 of 3 amps. The comparator 223 has an open collector output 235 with a pull up resistor 237 connected thereto. The output 235 provides the overcurrent waveform 107 to an overcurrent input 241 of an ignition generator 243. Also, the overcurrent waveform 107 is coupled to an input 251 of a logical AND gate 249. The logical AND gate 249 has an additional input 253 that is driven by the oscillator waveform 109 derived from an oscillator output 245 of the ignition generator 243. Further, the logical AND gate 249 has an output 255 providing the clock waveform 111 to a clock input 257 of a counter 259. The counter 259 is comprised of an 8 bit binary counter. Of course, another means such as a different length counter, a different radix counter, or another integrating device can be used in place of the 8 bit binary counter. The output 262 of this 8 bit binary counter 259 is coupled through a data bus 261 to the ignition generator 243. The 8 bit binary counter 259 also has a reset input 263 that is coupled to a CDO output 265 of the ignition generator 243 for receiving a CDO, or drive, waveform 101'. This CDO waveform 101', as shown in FIG. 3, is similar to the CDO waveform 101 discussed earlier in that it is used to control the, repetitive, providing of current to the primary winding 206 of the ignition coil 204. The difference is that it is adaptive to compensate for reflected energy provided by the primary winding 206 of the ignition coil 204. This will be described in more detail below. This CDO waveform 101' also drives a resistor 213 that is coupled to a control input, or a gate, 211 of the drive transistor 205. The ignition generator 243 receives information about the state of an engine from engine sensors 269. These are sensors conventional to internal combustion engine ignition systems and include a sensor to determine the angle of rotation of the engine so that spark timing can be scheduled by the ignition generator 243.

The ignition generator 243 in the preferred embodiment is constructed using a Motorola M68HC11 microcontroller. This microcontroller includes masked ROM for storing a firmware program later described in flow chart form in FIG. 4. Of course, it would be obvious to one of ordinary skill in the art to substitute another microcontroller or analogous circuit to perform the same function.

In FIG. 3 three waveforms are illustrated including a CDO waveform 101', an Iprimary waveform 105', and a Tdriver waveform 117'. As mentioned earlier the CDO waveform 101' is the newly derived waveform provided by the improved inductive load driver, that is responsive to reflected energy provided by the primary winding 206 of the ignition coil 204. The Iprimary waveform 105' is representative of the current in the primary winding 206 of the ignition coil 204, responsive to the CDO waveform 101'. The Tdriver waveform 117' is representative of the rise in temperature of the drive transistor 205, responsive to the current I$_{primary}$ 105' in the primary winding 206 of the ignition coil 204.

Notice that the three waveforms are shown with time base interruptions between times t1–t2, t3–t4, and t9–t10. This is shown this way to maintain a time scale favoring the illustration of a few specific CDO cycles, rather than many CDO cycles. This helps to focus the teaching on the average trend of the various waveforms illustrative of the principles taught herein. The waveform occurrences shown in FIG. 1 were shown on a comparatively finer time scale in order to better illustrate the instantaneous behavior of the waveforms.

For reference purposes, the waveform occurrence first illustrated in FIG. 1 on the left, representing the normal operation of an ignition cycle—that is without an open secondary condition present, is repeated between $t_0$ and $t_2$ in FIG. 3. Between $t_1$ and $t_2$ the secondary winding 203 of the ignition coil 204 is opened and the I$_{primary}$ waveform 105' reacts as shown by reference number 301. Consequently, the T$_{driver}$ waveform 117' reacts as the instantaneous effect of the coil driver absorbing the excess energy is illustrated. The peak temperature, denoted by $T_1$ is 65 degrees Celsius as noted earlier. Note that the behavior of these waveforms is identical to the behavior first illustrated in the I$_{primary}$ waveform 105 and the Tdriver waveform 117 on the right side of FIG. 1.

If the open secondary winding condition continues to persist the instantaneous temperature $T_2$ and the average temperature $T_3$ of the coil driver will continue to increase as shown. When the apparatus recognizes this, as detailed later, the current provided to the primary winding 206 is reduced from 5.5 amps to 3.5 amps, as shown between $t_6$ and $t_{12}$. This reduced current of 3.5 amps is chosen in order to reduce the power dissipation in the coil driver, while maintaining a marginal amount of current to the primary winding 206. This marginal amount of current may be enough to ignite the spark plug 201.

Note that between the time referenced by $t_6$ and $t_{12}$ the average trend of the driver temperature, shown in the T$_{driver}$ waveform 117' is decreasing. This is due to the reduction of current supplied to the primary winding 206 of the ignition coil 204. Because an open secondary condition can be intermittent, the current provided to the primary winding 206 will be increased back to 5.5 amps from 3.5 amps. Because the open secondary condition persists the Iprimary waveform 105' and the consequential T$_{driver}$ waveform 117' revert to their earlier behavior.

Next, the operation of the adaptive inductive load driver will be detailed, applying a method to control the apparatus described in FIG. 2. This method is illustrated in flow chart form in FIG. 4. As mentioned earlier this flow chart is representative of the firmware program microcoded into the M68HC11 microcontroller masked ROM, provided in the ignition generator 243. Of course, as mentioned earlier, an analogous apparatus could be substituted for this microcontroller and firmware. Note that FIG.'s 1, 2, 3 and 4 will all be referenced in this next teaching.

As mentioned earlier, if an open secondary condition is detected, the energy provided to the primary winding 206 of the ignition coil 204 will be reduced to a level sufficient to fire the spark plug 201, but insufficient to over dissipate the drive transistor 205. The following method uses a multilevel strategy that regards the first detection of an open secondary condition different than succeeding detections. This enables the coil driver to reliably detect an open secondary condition—including intermittence, and also allow the return to normal energy provision. Note that current and time are considered in detecting an open secondary condition. Those skilled in the art will recognize many other techniques to determine an open secondary condition that have an equivalent result.

If the firmware program executed in the microcontroller, in combination with the apparatus shown in FIG. 2, detects an open secondary condition in 3 successive ignition cycles, the current provided to the primary winding 206 is reduced for 10 successive ignition cycles. After 10 successive ignition cycles, the firmware program directs the apparatus to return to providing the original current to the primary winding 206. The details are as follows.

Figure 4:
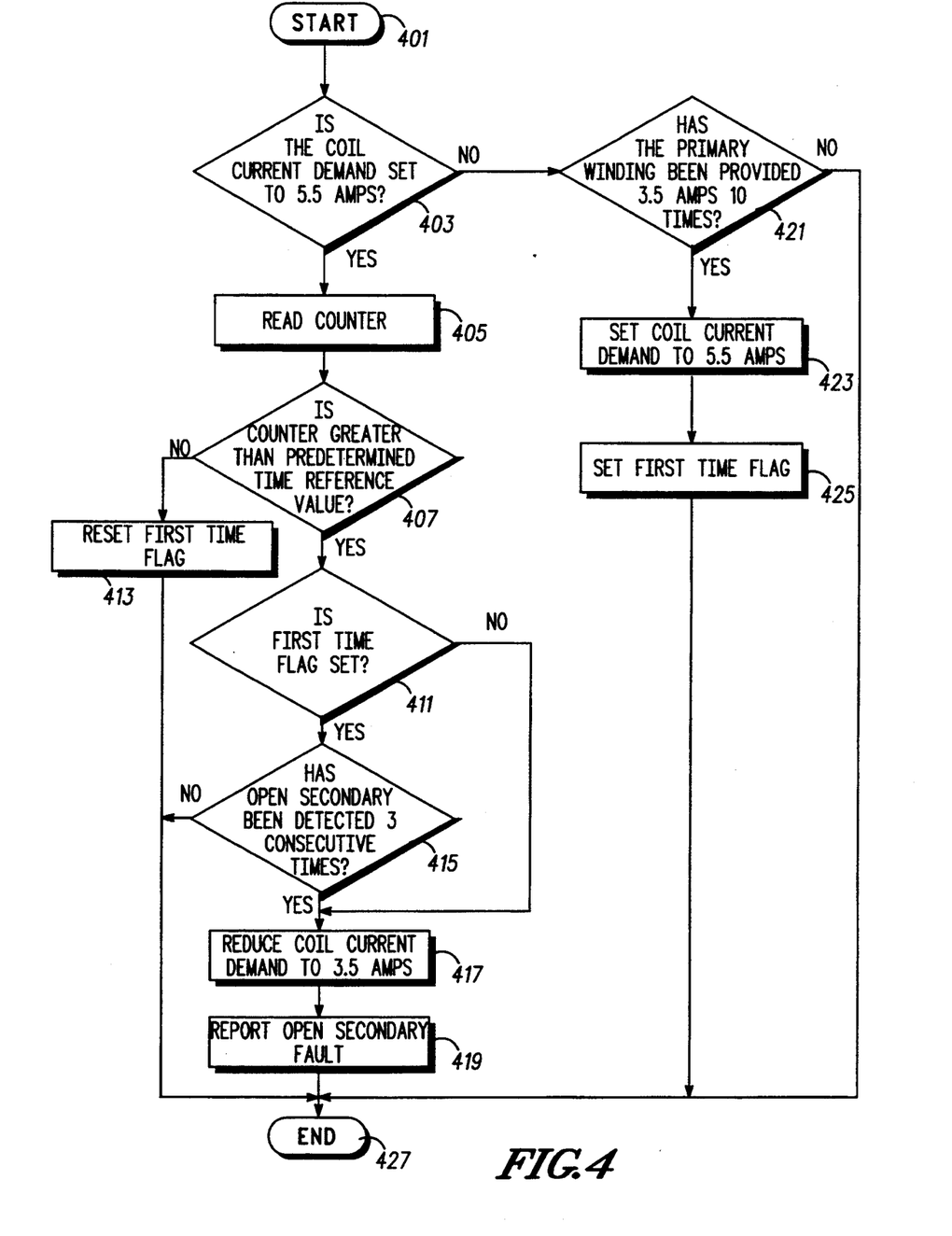
FIG. 4 is a flow chart representative of a firmware program microcoded into an ignition generator shown in FIG. 2.

The firmware program, or routine is entered at a start step 401. This routine is executed once every ignition cycle. A next step 403 determines if a coil current demand is set to 5.5 amps. This coil current demand of 5.5 amps corresponds to a requirement that another firmware program, executing in the M68HC11 microcontroller, has determined as appropriate to provide to the primary winding 206 of the ignition coil 204. This assumes a normally operating secondary winding 203. In practice, this coil current demand may be based on many conditions such as engine RPM, battery voltage and ambient temperature. This other firmware program is not detailed here because it is well known to those of ordinary skill in the art. For illustrative purposes, a fixed value of 5.5 amps is chosen for the normal current to be provided to the primary winding 206 and a value of 3.5 amps is chosen for an adjusted, or reduced, current to be provided. Of course, these values are truly variables and may be other absolute or relative values based on the many operating conditions and engine types this invention can be applied on. For instance the adjusted current of 3.5 amps can be a variable based on the actual reflected energy measured, rather than a fixed value. This will compensate for variation in components due to manufacturing tolerances, installation differences, and wear. Or, the adjusted current can be chosen to be a ratio, such as 80% of the normal operating current. The 3.5 amp level is a substantial non zero level that allows the spark plug to fire, if an open secondary condition is cured, but still reduces the total power dissipation of the drive transistor 205 must withstand if the open secondary condition persists. Alternatively, the current could be reduced to zero to minimize power dissipation even further.

Returning to FIG. 4, if the coil current demand is not set to 5.5 amps, an open secondary condition must have been detected earlier and step 421 is executed.

Step 421 determines if the primary winding 206 has been provided a current of 3.5 amps ten successive ignition cycles. If it hasn't, the routine is exited at step 427. The routine will continue to loop until the primary winding 206 has been provided 3.5 amps ten successive ignition cycles. Since, as mentioned earlier, an open secondary condition can often be intermittent, this reduced current of 3.5 amps is only provided for these ten loops or ignition cycles. If the primary winding 206 has been provided 3.5 amps ten successive ignition cycles then step 423 is executed. Of course, an alternative number of iterations could be chosen balancing actual power dissipation vs. a return to normal operation.

Now, the reflected energy will be measured by returning the coil current demand to 5.5 amps and viewing the effect with the apparatus in FIG. 2. Step 423 sets the coil current demand to 5.5 amps, returning it to its original setting. In step 425 a first time flag is set. This is done to indicate that an open secondary condition did exist enabling the coil driver to fall back to the reduced current sooner than otherwise allowed by a filter described later in step 415. Then the routine is exited, as shown in step 427.

Referencing FIG. 3 the CDO waveform 101' transits to an on-state at $t_2$. This forces the drive transistor 205, in FIG. 2, to provide current to the primary winding 206 of the ignition coil 204. The current $I_{primary}$ 105' builds to 5.5 amps. Then the CDO waveform 101' transits to an off-state at $t_3$. Note that this transition to an off-state also resets the counter 259 through application of the CDO waveform 101' to the reset input 263. Because in this case an open secondary condition exists, the current $I_{primary}$ 105' pertubates and eventually falls to zero, as described earlier. This is because the spark plug 201 did not dissipate the energy provided to the secondary winding 203 of the ignition coil 204 and it is reflected back to the primary winding 206 and to the drive transistor 205. Since the time scale of FIG. 3 is compressed to show the effect of multiple occurrences, the rightmost waveforms of FIG. 1 will be referenced next to illustrate what happens.

Because an open secondary condition exists, the energy that was provided to the secondary winding 203 of the ignition coil 204 is reflected back to the primary winding 206 and the current through resistor 217 now pertubates as shown at reference number 151 in FIG. 1. The resulting voltage 215 drives the comparator 223. When the current in the primary is less than the 3 amp current reference threshold, derived from the output 231 of the current reference threshold source 233, the output 235 of the comparator 233 will transit at 155 from a high-state 139 to a low-state 138 as shown in FIG. 1. Because of this, the clock waveform derived from the output of the logical AND gate 249 will transit to an off-state as shown at reference number 157.

When the current through resistor 217 increases above the 3 amp current reference threshold, the output of the comparator 233 will transit from a low-state to a high-state as shown by reference number 141. Because of this, the clock waveform derived from the output of the logical AND gate 249 will be responsive to the provided oscillator waveform 109 as shown at reference number 148. The counter's 259 clock input 257 will now respond by forcing the counter 259 to count up at a rate determined by the frequency of the oscillator waveform 109. It can be seen that as long as the current through resistor 217 is above the 3 amp current reference threshold, the counter will count up, signifying the time in oscillator waveform 109 periods that the current through resistor 217 is above the 3 amps. This essentially measures the energy that the primary winding 206 of the ignition coil 204 reflects to the drive transistor 205.

Returning to FIG. 3 the $T_{driver}$ waveform 117' reflects the instantaneous rise in the temperature of the drive transistor 205 to a level $T_1$. If this condition is left to persist, as it was in prior art, the average temperature of the drive transistor 205 would rise to an unacceptable level.

Returning to FIG. 4, in step 403 if it is determined that the ignition coil 204 current demand is set to 5.5 amps, step 405 is executed. Step 405 reads the counter 259. In step. 407 the value read from the counter 259 is compared with a predetermined reference value. In the preferred embodiment this predetermined reference value is 123. This predetermined reference value of 123 effectively represents a cumulative time that the primary winding 206 has provided current. If the counter value is greater than the predetermined reference value then the cumulative time the primary winding 206 has provided current, thereby energy—thus instantaneous power dissipation—thus predicted average $T_{driver}$ rise, was too high, indicating reflected current, thus an open secondary condition. If it doesn't, in step 413 the first time flag is reset and the routine is exited in step 427. If an open secondary condition is indicated then step 411 is executed.

In step 411 the first time flag is checked. If it is set then an open secondary condition had existed earlier and it was possibly intermittent and the routine immediately recognizes this and reduces the coil current demand in step 417. If the first time flag was not set then step 415 is executed. Of course, it would be obvious to one of ordinary skill in the art to adjust the coil current demand to a value based on the counter value indicative of the cumulative time that the primary winding 206 has provided current—thereby energy. This in effect adjusts the duration of the on-state of the CDO waveform 101'.

Step 415 determines if the open secondary winding has been detected three consecutive times. If an open secondary winding has not been detected three consecutive times, the routine is exited in step 427. This step 415 constitutes the filter mentioned earlier. Of course, those skilled in the art will recognize other filter techniques to reliably detect an open secondary condition. If an open secondary condition has been detected three consecutive times, the ignition coil 204 current demand is reduced to 3.5 amps in step 417. This is accomplished by driving the CDO waveform 101' to the on-state later in the dwell cycle, as shown in the CDO waveform 101' between $t_6$ and $t_7$. Then in step 423 the open secondary winding fault is reported. Finally, the routine is exited in step 427.

In conclusion an adaptive inductive load driver has been detailed that overcomes the deficiencies of prior art. With this invention increased reliability, smaller size, and more manufacturable ignition system can be realized. This results from reducing the drive, or energy provided by the drive transistor 205, to the primary winding 206 of the ignition coil 204—thus reducing power dissipation of the drive transistor 205 when an open secondary condition is detected.

What is claimed is:

1. An inductive load driver comprising:
   driving means, responsive to a to be provided drive waveform, for metering energy to an inductive load, wherein the metering of energy is dependent on a relationship between a first logical state of the drive waveform and a second logical state of the drive waveform, wherein the driving means provides energy to the inductive load dependent on the first logical state of the drive waveform and prevents the providing of energy to the inductive load dependent on the second logical state of the drive waveform; and
   control means for measuring a reflected energy provided by the inductive load to the driving means while the second logical state of the drive waveform is provided, and for providing the drive waveform to the driving means, the drive waveform having the relationship between the first and second logical state dependent on the measured reflected energy.

2. An inductive load driver in accordance with claim 1 wherein said inductive load is comprised of a transformer having a primary winding and a secondary winding.

3. An inductive load driver in accordance with claim 2 further comprising a spark plug connected to the secondary winding of said transformer.

4. An inductive load driver in accordance with claim 1 wherein the drive waveform provided by said control means is provided responsive to a time the measured reflected energy is provided by said inductive load to said driving means.

5. An inductive load driver in accordance with claim 4 wherein said control means reduces the energy to said inductive load responsive to an increase in the time the reflected energy is provided by said inductive load to said driving means.

6. An inductive load driver comprising:
   driving means, responsive to a to be provided drive waveform, for metering current to an inductive load, wherein the metering of current is dependent on a relationship between an on-state of the drive waveform and an off-state of the drive waveform, wherein the driving means provides current to the inductive load dependent on the on-state of the drive waveform and prevents the providing of current to the inductive load dependent on the off-state of the drive waveform; and
   control means for measuring a reflected current provided by the inductive load to the driving means while the off-state of the drive waveform is provided, and for providing the drive waveform to the driving means, wherein a duration of the on-state of the drive waveform is determined responsive to the measured reflected current provided by the inductive load to the driving means.

7. An inductive load driver in accordance with claim 6 wherein said inductive load is comprised of a transformer having a primary winding and a secondary winding.

8. An inductive load driver in accordance with claim 7 further comprising a spark plug connected to the secondary winding of said transformer.

9. An inductive load driver in accordance with claim 6 wherein the control means determines a time of transition from the off-state to the on-state of the drive waveform responsive to the current reflected by the inductive load to the driving means.

10. An inductive load driver in accordance with claim 6 wherein the control means determines a time of transition from the off-state to the on-state of the drive waveform responsive to a time duration that at least a predetermined level of current is reflected by the inductive load to the driving means.

11. An inductive load driver in accordance with claim 6 wherein the drive waveform provided by the control means is determined responsive to a time duration that at least a predetermined level of current is reflected by the inductive load to the driving means.

12. An inductive load driver in accordance with claim 6 wherein said control means meters the current provided to the inductive load responsive to and increase in the time duration that at least a predetermined level of current is reflected by the inductive load to the driving means.

13. An inductive load driver comprising:
   a drive transistor with a control input, a sense output, and a drive output, the drive output coupled to and providing current to an inductive load and then preventing the providing of current to the inductive load, wherein the inductive load reflects the previously provided current to the drive transistor when the drive transistor is preventing the providing of current;

current sensing means coupled to the sense output of the drive transistor for determining the previously provided current reflected by the inductive load, while the drive transistor is preventing the providing of current to the inductive load, and for providing an output indicative of the reflected current;

current reference means for providing a current reference threshold; and control means for providing a drive waveform having an on-state and an off-state, the drive waveform coupled to the control input of the drive transistor, wherein a duration of the on-state of the drive waveform is reduced when the current reflected at the output of the current sensing means exceeds the current reference threshold provided by the current reference means.

14. An inductive load driver in accordance with claim 13 wherein said inductive load is comprised of a transformer having a primary winding and a secondary winding.

15. An inductive load driver in accordance with claim 14 further comprising a spark plug connected to the secondary winding of said transformer.

16. An inductive load driver in accordance with claim 13 wherein the control means determines a transition from the off-state to the on-state of the drive waveform responsive to the output of the current sensing means.

17. An inductive load driver in accordance with claim 13 wherein said current sensing means further comprises means for measuring a time duration that at least a predetermined level of current is reflected by said inductive load to said drive transistor.

18. An inductive load driver in accordance with claim 17 wherein said control means reduces the current to said inductive load responsive to an increase in the time duration that at least a predetermined level of current is reflected by said inductive load to said drive transistor.

19. An inductive load driver in accordance with claim 17 wherein said current sensing means is comprised of a resistor.

20. An inductive load driver in accordance with claim 17 wherein said means for measuring a time the reflected current is provided to said drive transistor by said inductive load further comprises:

current reference means for providing a current reference threshold;

comparison means for comparing the output of said current sensing means to the current reference threshold provided by said current reference means and providing an output activated when the current provided at the output of said current sensing means exceeds the current reference threshold provided by said current reference means;

means for providing an oscillating waveform;

a logical AND gate having a first input, a second input, and an output, wherein the first input is coupled to said means for providing an oscillating waveform for receiving an oscillating waveform, the second input is coupled to the output of said comparison means, and the output, responsive to the first and second inputs for providing a clock waveform; and a counter having a clock input and an output, wherein the clock input is coupled to the output of said logical AND gate for receiving the clock waveform and the output, responsive to the clock input, for providing an indication of a time duration that the current reflected to said driving means by said inductive load exceeds the current reference threshold provided by said current reference means.

21. An adaptive ignition inductive load driver comprising:

a drive transistor with a control input, a sense output, and a drive output, the drive output coupled to and repetitively providing current to an ignition coil and preventing the providing of current to the ignition coil, wherein the ignition coil reflects the previously provided current to said drive transistor when said drive transistor is preventing the providing of current;

current sense resistor coupled to the sense output of said drive transistor for determining the current reflected by said ignition coil and for providing an output indicative of said reflected current;

current reference means for providing a current reference threshold;

comparison means for comparing the output of said current sense resistor to the current reference threshold provided by said current reference means and providing an output activated when the current provided at the output of said current sense resistor exceeds the current reference threshold provided by said current reference means;

means for providing an oscillating waveform;

a logical AND gate having a first input, a second input, and an output, wherein the first input is coupled to said means for providing an oscillating waveform for receiving an oscillating waveform, the second input is coupled to the output of said comparison means, and the output, responsive to the first and second inputs for providing a clock waveform;

a counter having a clock input and an output, wherein the clock input is coupled to the output of said logical AND gate for receiving the clock waveform and the output, responsive to the clock input, for providing an indication of a time duration that at least a predetermined level of current reflected by said inductive load exceeds the current reference threshold provided by said current reference means; and control means for providing an essentially periodic drive waveform having an on-state and an off-state, the essentially periodic drive waveform coupled to the control input of said drive transistor, wherein duration of the on-state of the essentially periodic drive waveform is reduced, responsive to a time duration that the current is reflected by said inductive load to said driving means determined at the output of said current sense resistor, exceeds the current reference threshold provided by said current reference means.

22. An inductive load driver in accordance with claim 21 wherein said inductive load is comprised of a transformer having a primary winding and a secondary winding.

23. An inductive load driver in accordance with claim 22 further comprising a spark plug connected to the secondary winding of said transformer.

24. An inductive load driver method comprising the steps of:

metering energy to an inductive load, wherein the metering of energy is dependent on a relationship between a first logical state of a drive waveform and a second logical state of the drive waveform, wherein the driving means provides energy to the inductive load dependent on the first logical state of the drive waveform and prevents the providing of energy to the inductive load dependent on the second logical state of the drive waveform; and     measuring a reflected energy provided by the inductive load while the second logical state of the drive waveform is provided, and adjusting the energy provided to the inductive load responsive to the measured energy.

25. An inductive load driver method comprising the steps of:

metering current to an inductive load, wherein the metering of current is dependent on a relationship between a first logical state of a drive waveform and a second logical state of the drive waveform, wherein the driving means provides current to the inductive load dependent on the first logical state of the drive waveform and prevents the providing of current to the inductive load dependent on the second logical state of the drive waveform;

measuring the current reflected by the inductive load; and     adjusting the current provided to the inductive load responsive to the step of measuring the current reflected by the inductive load.

26. An inductive load driver method in accordance with claim 25 wherein the step of measuring further comprises the step of measuring a time duration that the current reflected by the inductive load exceeds a predetermined current reference threshold.

27. An inductive load driver method in accordance with claim 25 wherein the step of adjusting the current provided to the inductive load further comprises the step of reducing the current provided to the inductive load responsive to an increase in the time duration that the current reflected by the inductive load exceeds the predetermined current reference threshold.

28. An inductive load driver method comprising the steps of:

providing current to an inductive load and then preventing the providing of current to the inductive load, wherein the inductive load reflects the previously provided current responsive to the step of preventing the providing of current;

providing a current reference threshold;

measuring the current reflected by the inductive load;

comparing the current reflected by the inductive load, measured in the step of measuring, to the current reference threshold and providing an overcurrent waveform;

comparing a time the overcurrent waveform is provided to a predetermined reference time; and     adjusting the current provided to the inductive load responsive to the step of comparing the time the overcurrent waveform is provided to a predetermined reference time.

29. An inductive load driver in accordance with claim 1 wherein the relationship between the first and second logical state of the drive waveform corresponds to a ratio of a time the drive waveform is provided by the control means in the first logical state to another time that the drive waveform is provided by the control means in the second logical state.

* * * * *